United States Patent
Fujimori

[11] Patent Number: 6,153,820
[45] Date of Patent: Nov. 28, 2000

[54] COMMUNICATION TECHNOLOGIES FOR MUSICAL TONE SIGNALS

[75] Inventor: Junichi Fujimori, Hamamatsu, Japan

[73] Assignee: Yamaha Corporation, Hamamatsu, Japan

[21] Appl. No.: 09/416,814

[22] Filed: Oct. 13, 1999

[30] Foreign Application Priority Data

Oct. 13, 1998 [JP] Japan .................................. 10-291040

[51] Int. Cl.⁷ .................................. G10H 1/46; G10H 7/00
[52] U.S. Cl. .................................. 84/633; 84/645
[58] Field of Search .................................. 84/600, 609, 633, 84/645

[56] References Cited

U.S. PATENT DOCUMENTS

| | | | |
|---|---|---|---|
| 5,225,618 | 7/1993 | Wadhams | 84/634 X |
| 5,355,762 | 10/1994 | Tabata | 84/609 |
| 5,886,275 | 3/1999 | Kato et al. | 84/609 |
| 5,977,468 | 11/1999 | Fujii | 84/609 |

FOREIGN PATENT DOCUMENTS

| | | |
|---|---|---|
| 4-10077 | 2/1992 | Japan . |
| 5-88674 | 4/1993 | Japan . |
| 5-347630 | 12/1993 | Japan . |
| 7-287572 | 10/1995 | Japan . |

*Primary Examiner*—Jeffrey Donels
*Attorney, Agent, or Firm*—Morrison & Foerster

[57] ABSTRACT

A musical tone signal communications apparatus having: a timing adjusting unit for adjusting a timing of a digital musical tone signal at each channel; a level adjusting unit for adjusting a level of the digital musical tone signal at each channel; a receiving unit for receiving a digital musical tone signal from an external device; an adder unit for adding at each channel the digital musical signal adjusted by the timing adjusting unit and level adjusting unit to the digital musical tone signal received by the first receiving unit; and a transmitting unit for transmitting an added digital musical tone signal generated by the adder unit to another external device.

21 Claims, 6 Drawing Sheets

COMMUNICATION TECHNOLOGIES FOR MUSICAL TONE SIGNALS

BACKGROUND OF THE INVENTION a) Field of the Invention

The present invention relates to communication technologies and more particularly to communication technologies for musical tone signals.

b) Description of the Related Art

Figure 7:
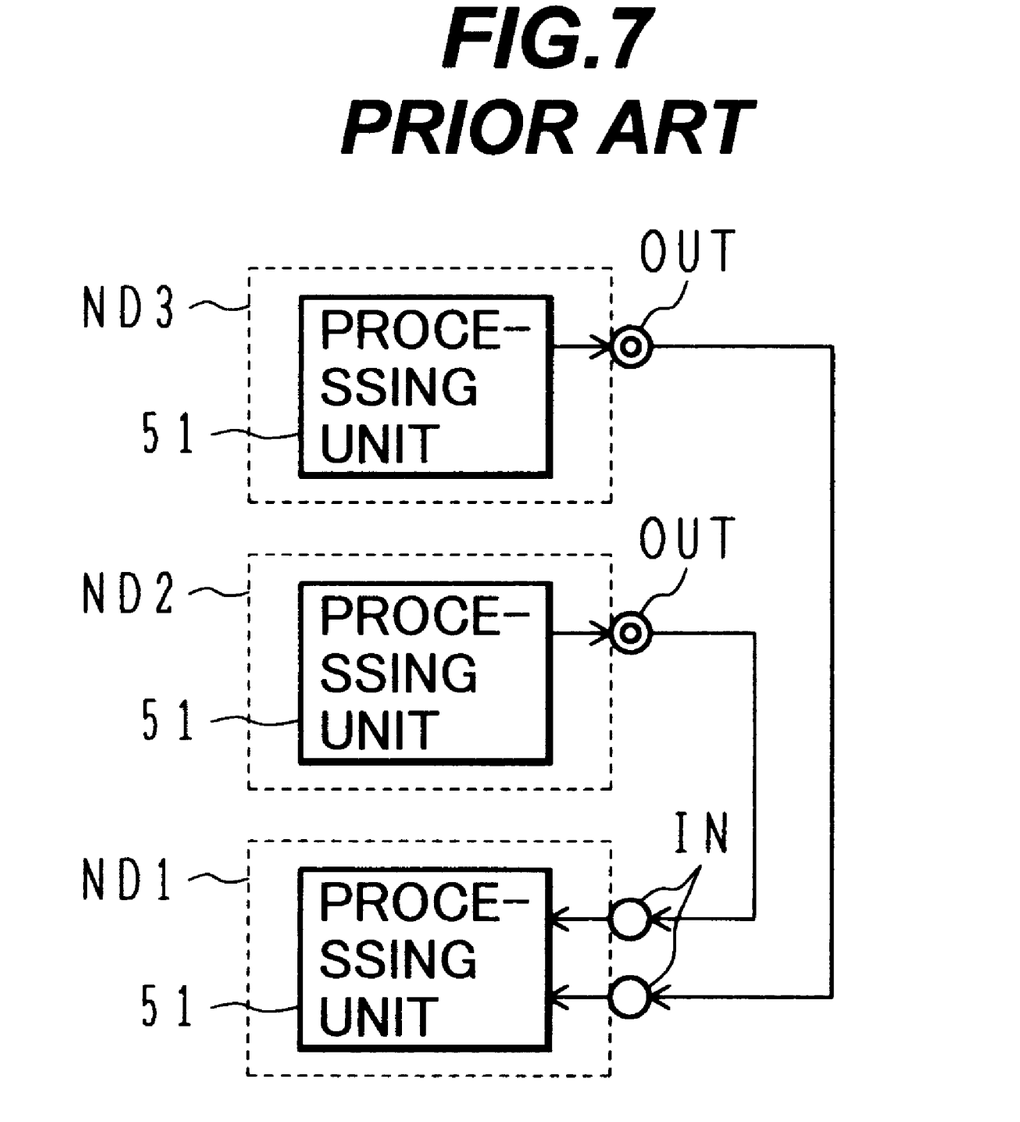
FIG. 7 is a block diagram showing the structure of a network according to conventional techniques.

FIG. 7 shows an example of a network having three nodes ND1 to ND3 connected to each other. One example for digital communications standards and specifications between nodes is IEEE 1394 specifications.

Each of the nodes ND1 to ND3 has a processing unit 51. The node ND3 outputs a signal from an output terminal OUT and the node ND1 receives the signal at an input terminal IN. The node ND2 outputs a signal from an output terminal OUT and the node ND1 receives the signal at another input terminal IN. The node ND1 receives the signals from the two nodes ND2 and ND3 and processes the received signals.

These input terminals IN and output terminals OUT are logical terminals. The input terminal IN and output terminal OUT may use one common physical terminal.

A network is not limited only to the network constituted of three nodes ND1 to ND3, but four or more nodes may constitute a network. In the latter case, the node ND1 is sometimes required to process signals from three or more nodes. If the node ND1 is required to receive signals from a number of nodes, the input terminals IN may comprise as many as the number of nodes are required. If the number of nodes becomes too large, the node 1 cannot process the signals supplied from the nodes.

SUMMARY OF THE INVENTION

It is an object of the present invention to provide a musical tone signal communication apparatus or method suitable for multiple connections.

According to one aspect of the present invention, there is provided a musical tone signal communications apparatus comprising: a timing adjusting unit for adjusting a timing of a digital musical tone signal; a level adjusting unit for adjusting a level of the digital musical tone signal; a first receiving unit for receiving a digital musical tone signal from an external device; an adder unit for adding the digital musical signal adjusted by the timing adjusting unit and the level adjusting unit to the digital musical tone signal received by the first receiving unit; and a first transmitting unit for transmitting an added digital musical tone signal generated by the adder unit to an external device.

According to another aspect of the present invention, there is provided a musical tone signal communications apparatus comprising: a timing adjusting unit for adjusting a timing of a digital musical tone signal at each channel; a level adjusting unit for adjusting a level of the digital musical tone signal at each channel; a receiving unit for receiving a digital musical tone signal from an external device; an adder unit for adding at each channel the digital musical signal adjusted by the timing adjusting unit and the level adjusting unit to the digital musical tone signal received by the first receiving unit; and a transmitting unit for transmitting an added digital musical tone signal generated by the adder unit to an external device.

The adder unit adds at each channel the digital musical tone signal having the adjusted timing and level to the digital musical tone signal received by the receiving unit. The receiving unit can receive a digital musical tone signal generated by another musical tone signal communications apparatus. In this case, the transmitting unit can transmit a digital musical tone signal generated by the musical tone signal communications apparatus added to a digital musical tone signal generated by another musical tone signal communications apparatus. Since the added musical tone signal is transmitted to a destination node, the process load of the destination node can be reduced.

According to still another aspect of the invention, there is provided a musical tone signal communications apparatus comprising: a detector unit for detecting a transmission source node stored in each node; a connecting unit for logically and serially connecting a second node to a first node if the detector unit cannot detect a transmission source node of the first node, a process being repeated if the detector unit detects the transmission source node of the first node, the process searching a third node whose transmission source node cannot be detected, and logically and serially connecting the second node to the searched third node; and a transmitting unit for adding a signal received at the serially connected third node from the transmission source second node to a signal generated by the third node and transmitting an added signal to the first node.

When a new node is to be connected to an existing node, it is necessary to set a new communication path from the new node to the existing node. In this case, the new communication path is set by logically and serially connecting the new node to the existing node. Therefore, even if the number of connected nodes increases, a process load of the destination node becomes relatively small.

DETAILED DESCRIPTION OF THE PREFERRED EMBODIMENTS

Figure 1A:
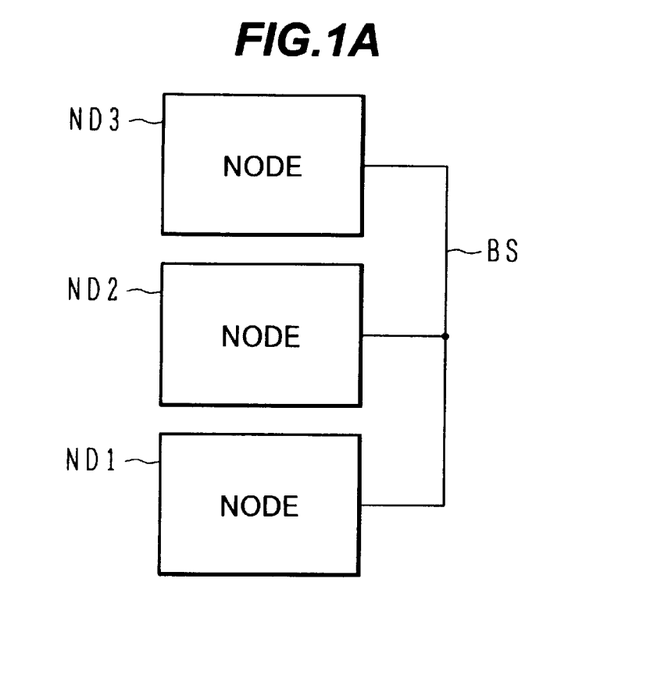
FIG. 1A is a block diagram showing tree nodes constituting a network.

FIG. 1A is a block diagram showing the structure of a communications network.

Each of nodes ND1 to ND3 is a digital signal processing apparatus having a communication interface. The nodes ND1 to ND3 are connected by communication cables (buses) BS. Communications may be digital serial communications of IEEE 1394 specifications or USB (universal serial bus), or digital parallel communications.

Figure 1B:
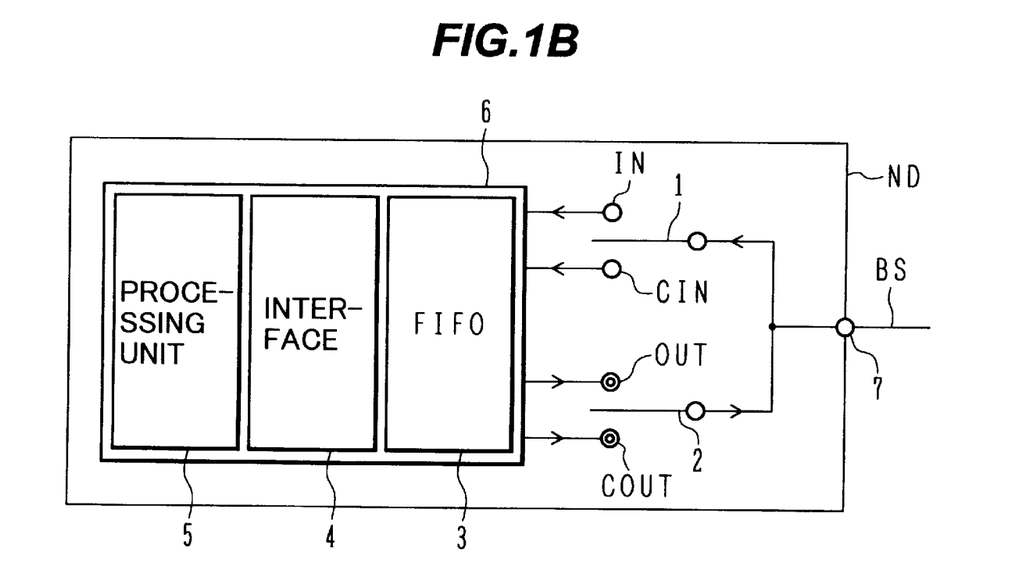
FIG. 1B is a circuit diagram of each node.

Each or all of the nodes ND1 to ND3 are called hereinafter a node ND. FIG. 1B shows the structure of each node ND.

For example, in tow-way serial communications of IEEE 1394 specifications, the bus BS is connected to one input/output terminal 7. A switch 1 transfers a signal (data) input from the bus BS via the input/output terminal 7, to an input terminal IN or a cascaded input terminal CIN. A switch 2 transfers a signal (data) output from an output terminal OUT or a cascaded output terminal COUT, to the bus BS via the input/output terminal 7.

The input terminal IN, cascaded input terminal CIN, output terminal OUT, and cascaded output terminal COUT are logical terminals and are connected to a processor block 6. The processor block 6 includes a first-in-first-out (FIFO) circuit 3 for buffering input and output data, a communication interface 4 for transmitting/receiving data to/from the bus, and a processing unit 5 for processing input and output data.

For example, the input/output data may be digital musical tone data (musical tone signal). The musical tone data is, for example, audio data or MIDI (musical instrument digital interface) data. The input/output data is assigned a channel number. The switch 1 selectively connects the input terminal IN or cascaded input terminal CIN in accordance with the channel number, and the switch 2 selectively connects the output terminal OUT or cascaded output terminal COUT in accordance with the channel number. Data of each channel (data unit) is transmitted over the bus BS, for example, through time division.

Figure 2:
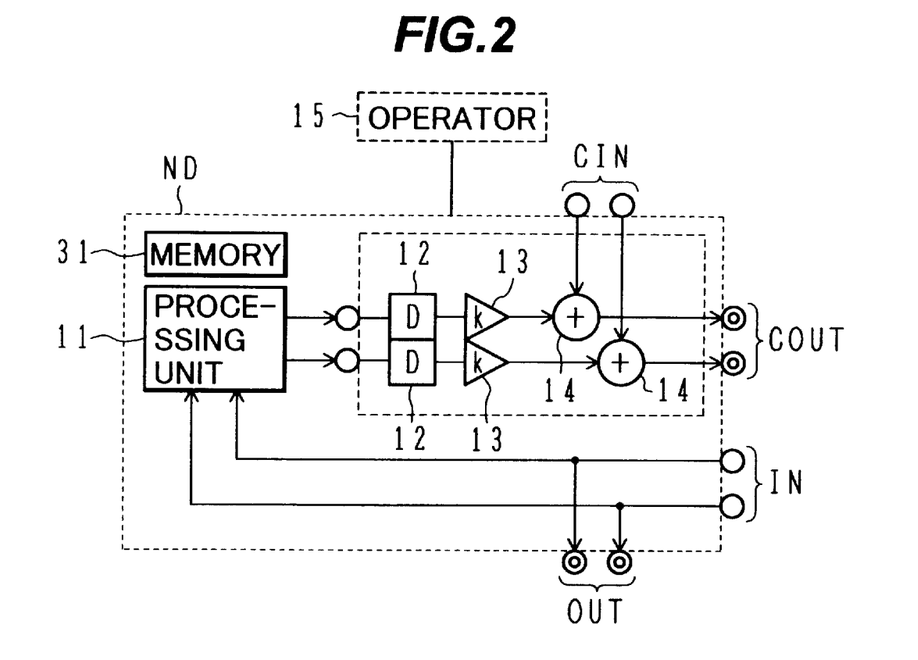
FIG. 2 is a block diagram showing the more specific structure of each node.

FIG. 2 is a diagram showing a logical connection diagram of each node.

The node ND has a pair of input terminals IN, a pair of cascaded input terminals CIN, a pair of output terminals OUT, and a pair of cascaded output terminals COUT. Each pair of terminals is, for example, right and left channel terminals or first and second terminals. In the following, it is assumed that each pair of terminals is right and left channel terminals.

Data input to the input terminals IN is directly output from the output terminal and also supplied to the processing unit 11. A delay circuit 12, a weighing circuit 13 and an adder circuit 14 are provided for each channel. As shown in FIG. 2, since there are two channels, two circuits are provided respectively for every one of the circuits 12, 13 and 14.

The processing unit 11 digitally processes the received data of the right and left channels and supplies the processed data to the delay circuits 12, or alternatively generates data and supplies it to the delay circuits 12. The delay circuits 12 delay the data of the right and left channels by predetermined times to adjust the timings of the data, and supply the delayed data to the weighing circuits 13.

The weighing circuits 13 multiply right and left channel data by a coefficient k to adjust the levels of the data and supply the level adjusted data to the adder circuits 14. The adder circuits 14 add the right and left channel data supplied from the weighing circuit 13 to right and left channel data input from the cascaded input terminals CIN, and output the added data to the cascaded output terminal COUT.

The adder circuit 14 adds audio data of each channel. Namely, the adder circuit 14 adds the left channel data supplied from the weighing circuit 13 to the left channel data input from the cascaded input terminal CIN, and the other adder circuit 14 adds the right channel data supplied from the other weighing circuit 13 to the right channel data input from the other cascaded input terminal CIN. The number of cascaded output terminals OUT is two, right and left channel cascaded output terminals, and equal to the number of cascaded input terminals CIN.

The cascaded output terminal COUT basically outputs the sum of the data input to the input terminal IN and the data input to the cascaded input terminal CIN. The input timings of the signals input to the input terminal IN and cascaded input terminal CIN may become different depending upon the process times at other nodes and/or communication times. The delay circuits 12 adjust the input timings of the signals input to the input terminal IN and cascaded input terminal CIN. A memory 31 of the node ND stores an identifier of a transmission source node from which data is transmitted to this node.

Figure 3:
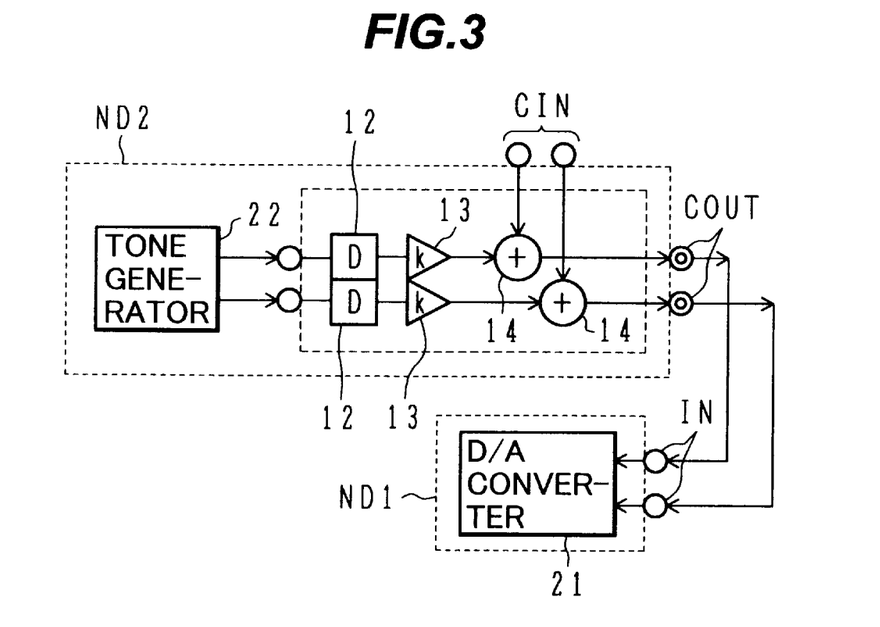
FIG. 3 is a logical connection diagram of a network in which a signal is transmitted from a node ND2 to a node ND1.

FIG. 3 is a logical connection diagram of a network in which data is transmitted the node ND2 to the node ND1.

The physical connection corresponding to this logical connection diagram of FIG. 3 is shown in FIGS. 1A and 1B. The network in which data is transmitted from the node ND2 to the node ND1 can be represented by the logical connection diagram shown in FIG. 3. The node ND3 is not logically connected to the network.

The node ND2 has basically the same structure as that of the node ND shown in FIG. 2. The processing unit 11 shown in FIG. 2 is, for example, a tone generator 22. The tone generator 22 can generate and output audio data (musical tone signal). Since the input terminals IN and output terminals OUT are not used in this example for the node ND2, they are not shown in FIG. 3.

The node ND1 has basically the same structure as that of the node ND shown in FIG. 2. In FIG. 3, only the input terminal IN and a D/A converter 21 (corresponding to the processing unit 11 shown in FIG. 2) are shown in FIG. 3. Each process to be described in the following is executed at each of the right and left channels, similar to the above description.

First, the node ND2 will be described. If the transmission source node is only the node ND2, the cascaded input terminals CIN of the node ND2 are in an open state, and no data is input to these terminals CIN. The tone generator 22 outputs digital audio data to the delay circuit 12. The delay circuit 12 delays the audio data by a predetermined time and outputs it to the weighing circuit 13.

The weighing circuit 13 multiplies the audio data by a coefficient k and outputs it to the adder circuit 14. Since no data is input to the cascaded input terminal CIN, the adder circuit 14 directly outputs the audio data to the cascaded output terminal COUT, The cascaded output terminal COUT of the node ND2 is connected to the input terminal IN of the node ND1. The audio data input to the input terminal IN of the node ND1 is supplied to the D/A converter 21 which converts the audio data into analog audio data. The analog audio data can be reproduced by a loudspeaker as musical sounds.

The logical connection state of this network is stored in the memory 31 (FIG. 2) of each node. More specifically, each node stores an identifier of the transmission source node from which data is supplied. For example, the memory 31 of the node ND1 stores an identifier of the node ND2 from which data is supplied to the node ND1. The transmission source node of the node ND1 is the node ND2. The node ND2 stores information indicating that there is no transmission source node of the node ND2. For the general background of this technique, for example, refer to JP-A-7-287572 reference.

Figure 4:
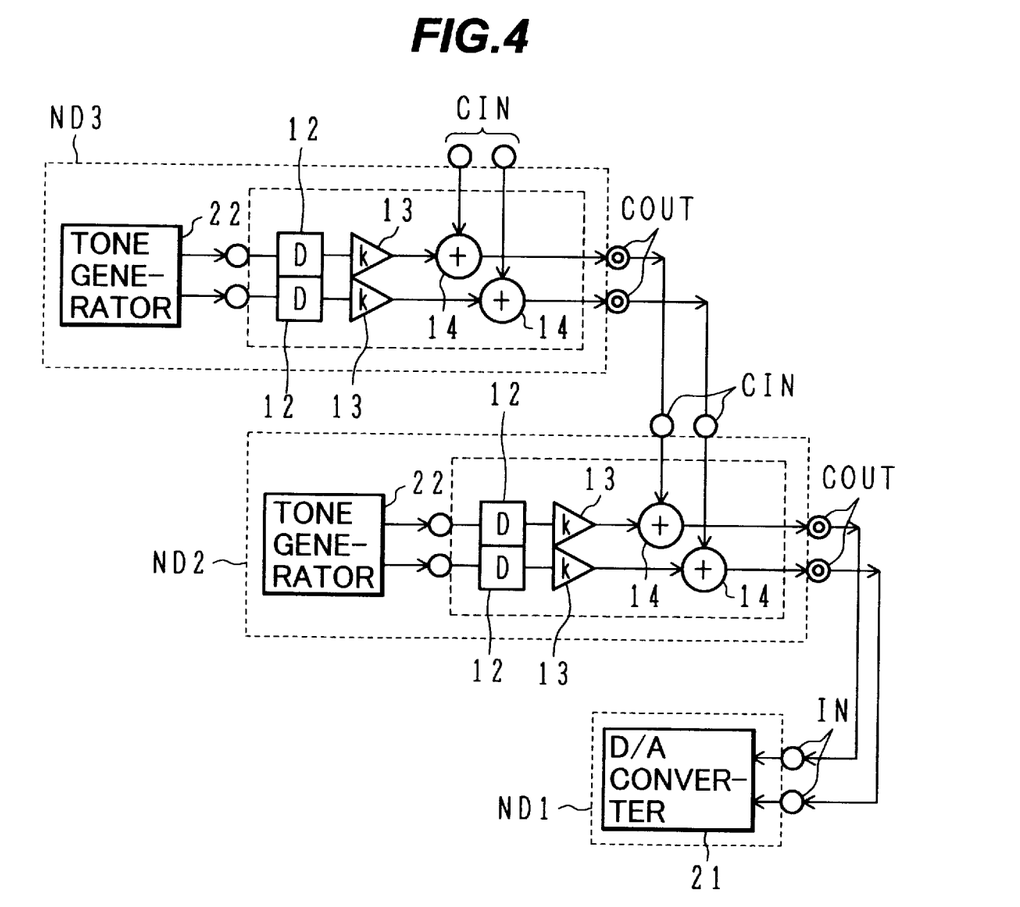
FIG. 4 is a logical connection diagram of a network in which a signal is transmitted from nodes ND2 and ND3 to a node ND1.

FIG. 4 is a logical connection diagram of a network in which data is transmitted from the nodes ND2 and ND3 to the node ND1.

The physical connection corresponding to this logical connection diagram of FIG. 4 is shown in FIGS. 1A and 1B.

The network in which data is transmitted from the nodes ND2 and ND3 to the node ND1 can be represented by the logical connection diagram shown in FIG. 4.

The nodes ND2 and ND3 have basically the same structure as that of the node ND2 shown in FIG. 3, and the node ND1 has basically the same structure as that of the node ND1 shown in FIG. 3.

Consider now that the node ND3 is added to the network shown in FIG. 3 to configure the network shown in FIG. 4. Namely, in the network shown in FIG. 3, only the node ND2 transmits data to the node ND1, whereas in the network shown in FIG. 4, also the node ND3 transmits data to the node ND1.

As described earlier, when the network shown in FIG. 3 is configured, the node ND1 has already stored information that the transmission source node of the node ND1 is only the node ND2. In order to allow the node ND3 to transmit data to the node ND1, it is necessary to logically connect a new node ND3 to the network shown in FIG. 3.

First, in order to check the transmission source node of the node ND1, the contents of the memory of the node ND1 are read and checked. With this check, it is possible to know that the transmission source node of the node ND1 is the node ND2. Since the-node ND2 is already connected to the input terminals of the node ND1, the new node ND3 cannot be connected to the node ND1.

Next, in order to check the transmission source node of the node ND2 connected to the node ND1, the contents of the memory of the node ND2 are read and checked. With this check, it is possible to know that there is no transmission source node of the node ND2. This means that the cascaded input terminals of the node ND2 are in an open state. When it is confirmed that the node ND2 has the cascaded input terminals CIN in the open state, the new node ND3 is cascade connected to this node ND2. Namely, the cascaded output terminals COUT of the node ND3 are connected to the cascaded input terminals CIN of the node ND2.

In this example, three nodes ND are connected to the network. If four or more nodes ND are to be connected, the above-described check or search operation is repeated until the node ND having the cascaded input terminals CIN in the open state is found, and a new node ND is logically connected to the found node ND. This logical connection is automatically performed by searching the transmission source nodes. A system for realizing the logical connection may be provided at each node.

When the new node ND3 is logically connected to the network, the connection state of the network is newly stored at each node ND. In the above example, the transmission source node of the node ND1 is the node ND2, the transmission node of the node ND2 is the node ND3, and the node ND3 has no transmission source node.

Next, the communication operation of the network will be described. The node ND3 has the cascaded input terminals CIN in the open state and outputs audio data from the cascaded output terminals COUT, similar to the node ND2 shown in FIG. 3. The audio data is then input to the cascaded input terminals CIN of the node ND2.

Next, the operation of the node ND2 will be described. The tone generator 22 outputs digital audio data to the delay circuits 12. The delay circuits 12 delay the audio data by predetermined times and output it to the weighing circuits 13. The weighing circuits 13 multiply the audio data by a coefficient k and output it to the adder circuits 14.

Since the audio data is input to the cascaded input terminals CIN from the node ND3, the adder circuits 14 add the audio data input from the weighing circuits 13 to the audio data input to the cascaded input terminals CIN, and output the added audio data to the cascaded output terminals COUT. The node ND2 basically add the audio data generated by its tone generator 22 to the audio data output from the node ND3 and output the added audio data.

The cascaded output terminals COUT of the node ND2 are connected to the input terminals IN of the node ND1. Since the node ND1 is the transmission end node or destination node of the network, the audio data is input to the input terminals IN. The audio data input to the input terminals IN of the node ND1 is supplied to the D/A converter 21. The D/A converter 21 converts the digital audio data into analog audio data.

The node ND1 is supplied with the audio data generated by the node ND2 added to the audio data generated by the node ND3. Namely, the node ND1 receives the audio data of both the nodes ND2 and ND3.

The node ND1 shown in FIG. 7 is required to independently receive the audio data of both the nodes ND2 and ND3, add the audio data, and D/A covert the digital audio data into analog audio data. The node ND1 is also required to use a plurality of input terminals IN for independently receiving the audio data. As the number of transmission source nodes such as nodes ND2 and ND3 increases, the number of input terminals at the destination node ND1 increases.

The node ND1 shown in FIG. 4 receives the added audio data so that it is unnecessary to perform an addition operation and a process load can be reduced. Furthermore, even if there are a number of source nodes of the node ND1, it is sufficient that the node ND1 uses only a pair of input terminals (right and left channel input terminals) for receiving the added audio data.

The delay circuits 12 of the nodes ND2 and ND3 adjust the timings of the audio data generated at each node. If the adder circuits 14 simply add the audio data, the level of the added audio data becomes high as the number of additions of audio data increases. In order to avoid this, the weighing circuits 13 of the nodes ND2 and ND3 adjust the level of the audio data.

The delay time to be set by the delay circuit 12 and the weighing coefficient k to be set by the weighing circuit 13 may use values predetermined properly from the number of connected nodes, or may use values adjusted by a user by using an operator 15 shown in FIG. 2.

Figure 5:
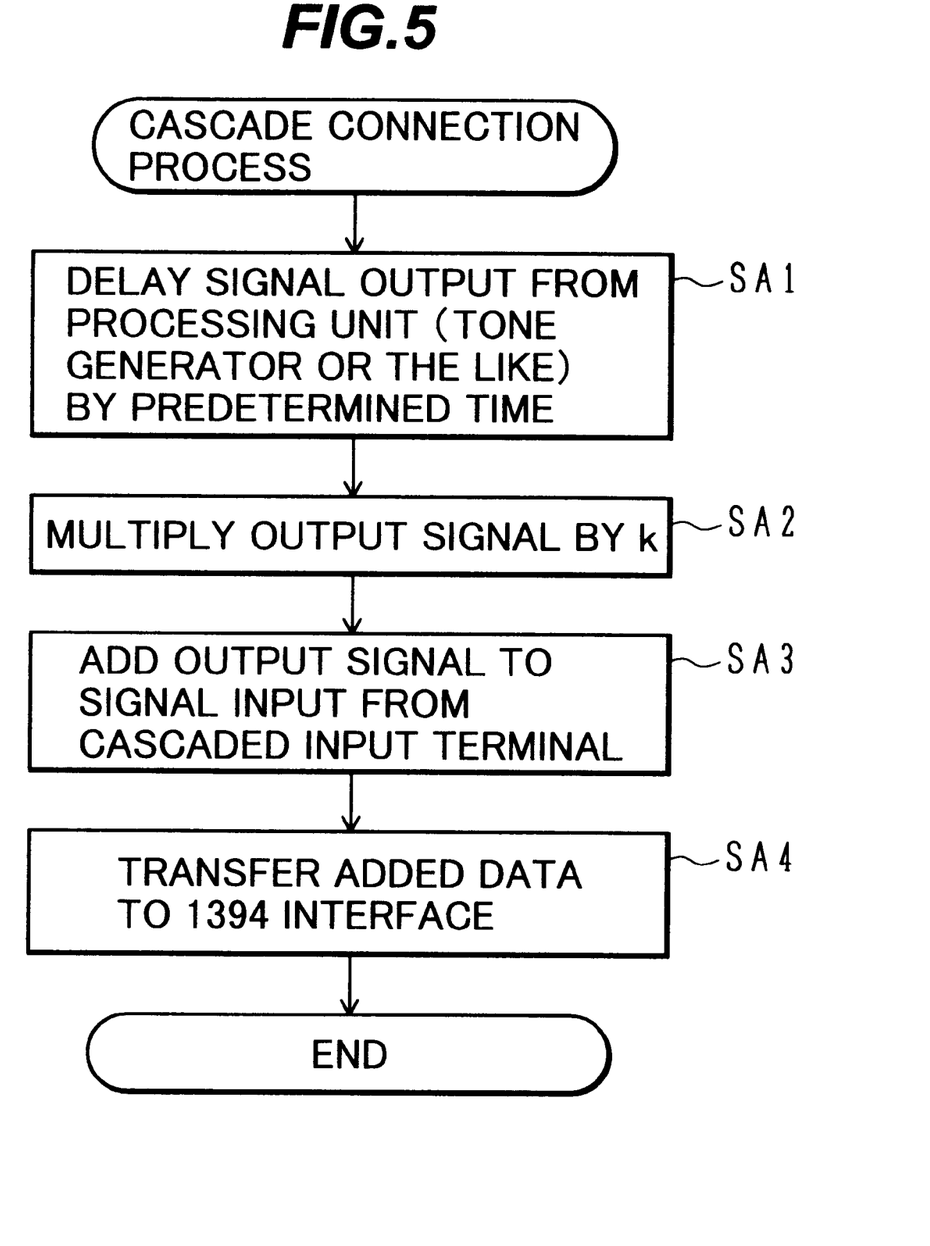
FIG. 5 is a flow chart illustrating the operation to be executed by a cascade-connected node.

FIG. 5 is a flow chart illustrating the operation to be executed by the node ND2 shown in FIG. 4. The operation to be executed by the node ND3 is similar to that of the node ND2.

At Step SA1, a signal output from the tone generator 22 is delayed by a predetermined time by the delay circuit 12. The tone generator 22 is one example of the processing unit 11 shown in FIG. 2.

At Step SA2, a signal output from the delay circuit 12 is multiplied by the coefficient k by the weighing circuit 13.

At Step SA3, the signal output from the weighing circuit 13 is added to the signal input to the cascaded input terminal CIN. In IEEE 1394 communications, a signal input to the cascaded input terminal is a packetized signal. Therefore, an addition operation is executed after a necessary signal (audio data) is derived from the packet.

At Step SA4, the added signal is transferred to the communication interface (e.g., IEEE 1394 interface) 4 shown in FIG. 1B. The communication interface 4 packetizes the added signal and transmits the packet from the cascaded output terminal COUT.

Figure 6:
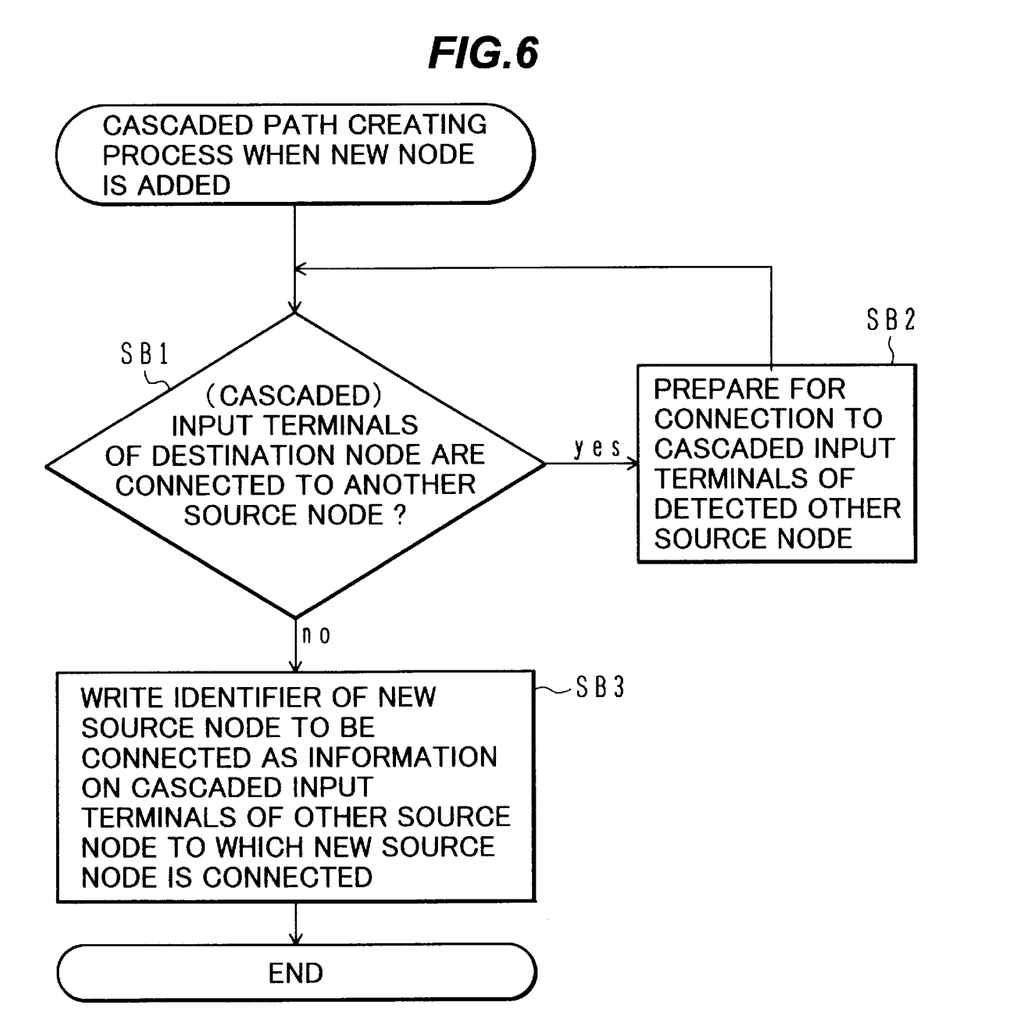
FIG. 6 is a flow chart illustrating an operation of a communication path creating process which is executed when a new node is added.

FIG. 6 is a flow chart illustrating an operation of a communication path creating process to be executed when the network shown in FIG. 3 is reconfigured to the network shown in FIG. 4. In the above example, the node ND3 is added to the network shown in FIG. 3.

At Step SB1, it is checked whether the cascaded input terminals CIN or input terminals IN of a transmission destination node are already connected to another node. For example, when the node ND3 is to be connected to the node ND1, it is checked whether the cascaded input terminals CIN or input terminals IN of the transmission destination node ND1 are already connected to another node ND. In the example shown in FIG. 4, the node ND2 is already connected to the input terminals IN of the node ND1.

If connected to another node ND, the flow advances to Step SB2 following a yes arrow, whereas if not connected to another node ND, the flow advances to Step SB3 following a no arrow.

At Step SB2, a preparation is made for a connection to the cascaded input terminals of the detected other source node ND. For example, since the node ND2 is connected to the node ND1, a preparation is made for a connection to the node ND2. Thereafter, the flow returns to Step SB1.

At Step SB1, it is checked whether the cascaded input terminals CIN or input terminals In of the detected other source node ND is connected to a second other source node. In the example shown in FIG. 4, since the cascaded input terminals CIN of the node ND2 are in the open state, the flow advances to Step SB3 following the no arrow.

At Step SB3, an identifier of the new source node to be connected is written in the memory 31 (FIG. 2) as the information on the cascaded input terminals CIN of the other source node to which the new source node is connected. With the above operation, the process of this flow chart is terminated.

In the network shown in FIG. 7, audio data generated by the nodes ND2 and ND3 is independently input to the node ND1. Namely, the nodes ND2 and ND3 are connected in parallel to the node ND1.

In the network shown in FIG. 4, the nodes ND1, ND2 and ND3 are serially connected (cascade connected) in terms of logical connection. If nodes ND are connected in parallel, the number of connectable nodes has a physical limit. However, if nodes ND are serially connected in terms of logical connection, the number of connectable nodes has no theoretical limit.

The nodes ND2 and ND3 each have the cascaded input terminals CIN and cascaded output terminals COUT. The cascaded input terminals CIN of the node ND2 are connected to the cascaded output terminals COUT of the node ND3. The node ND2 adds the audio data generated by this node to the audio data generated by the node ND3, and outputs the added audio data from the cascaded output terminals COUT.

The node ND1 receives the added audio data. The node ND1 can therefore receive the substantial audio data generated by both the nodes ND2 and ND3. The nodes ND2 and ND3 can share the node ND1.

Since the node ND1 receives the added audio data, the node ND1 is not required to execute an addition process so that the process load can be reduced. Even if there are a number of source nodes of the node ND1, it is sufficient for the node ND1 to use only a pair of input terminals IN for receiving the added audio data.

The node ND can use both the input terminals IN and cascaded input terminals CIN. More specifically, the audio data from the same source node may be input to both the input terminals IN and cascaded input terminals CIN to directly output the audio data from the output terminals and output the added audio data from the cascaded output terminals COUT. One node may receive the audio data from the output terminals OUT, and another node may receive the added audio data from the cascaded output terminals COUT.

As shown in FIG. 1B, to which pair of input terminals IN or cascaded input terminals CIN the audio data is input can be determined in accordance with a channel.

The present invention has been described in connection with the preferred embodiments. The invention is not limited only to the above embodiments. It is apparent that various modifications, improvements, combinations, and the like can be made by those skilled in the art.

What is claimed is:

1. A musical tone signal communication apparatus comprising:

a timing adjusting unit for adjusting a timing of a digital musical tone signal;

a level adjusting unit for adjusting a level of the digital musical tone signal;

a first receiving unit for receiving a digital musical tone signal from a source external to the musical tone signal communications apparatus;

an adder unit for adding the digital musical signal adjusted by said timing adjusting unit and said level adjusting unit to the digital musical tone signal received by said first receiving unit; and a first transmitting unit for transmitting an added digital musical tone signal generated by said adder unit to a receiver external to the musical tone signal communications apparatus.

2. A musical tone signal communications apparatus according to claim 1, wherein:

said timing adjusting unit adjusts the timing at each channel;

said level adjusting unit adjusts the level at each channel; and said adder unit adds the digital musical tone signals at each channel.

3. A musical tone signal communications apparatus according to claim 2, wherein:

said first receiving unit time divisionally receives a digital musical tone signal at each channel; and said first transmitting unit time divisionally transmits a digital musical tone signal at each channel.

4. A musical tone signal communications apparatus according to claim 2, further comprising:

a second receiving unit for receiving a digital musical tone signal from a source external to the musical tone signal communications apparatus; and a second transmitting unit for transmitting the digital musical tone signal supplied from said second receiving unit directly to a receiver external to the musical tone signal communications apparatus.

5. A musical tone signal communications apparatus according to claim 4, wherein said first and second transmitting units and said first and second receiving units have one physical input/output terminal for transmitting/receiving a digital musical tone signal.

6. A musical tone signal communications apparatus according to claim 4, further comprising:

a first switch for switching between said first and second receiving units to receive a digital musical tone signal from the external source, in accordance with each channel; and a second switch for switching between said first and second transmitting units to transmit a digital musical tone signal to the external receiver in accordance with each channel.

7. A musical tone signal communications apparatus according to claim 4, wherein said timing adjusting unit and said level adjusting unit adjust the timing and level of the digital music tone signal received by said second receiving unit.

8. A musical tone signal communications apparatus according to claim 4, further comprising a processor for processing the digital musical tone signal received by said second receiving unit, wherein said timing adjusting unit and said level adjusting unit adjust the timing and level of a digital musical tone signal processed by said processor.

9. A musical tone signal communications apparatus according to claim 2, further comprising a tone generator for generating a digital musical tone signal, wherein said timing adjusting unit and said level adjusting unit adjust the timing and level of the digital musical tone signal generated by said tone generator.

10. A musical tone signal communications apparatus according to claim 2, wherein said first transmitting and receiving units transmit/receive a packetized digital musical tone signal.

11. A musical tone signal communications apparatus according to claim 2, wherein said first transmitting and receiving units serially transmit/receive the packetized digital musical tone signal.

12. A musical tone signal communications apparatus according to claim 2, wherein said first transmitting and receiving units transmit/receive a digital musical tone signal in accordance with at least one of IEEE 1394 and USB requirements.

13. A musical tone signal communications apparatus according to claim 11, wherein said first transmitting and receiving units time divisionally transmit/receive a digital musical tone signal at each channel.

14. A musical tone signal communications apparatus comprising:

a detector unit which detects a transmission source node identifier stored in each node;

a connecting unit for logically and serially connecting a second node to a first node if said detector unit cannot detect a transmission source node identifier stored in the first node, but if said detector unit detects a transmission source node identifier stored in the first node, searching a third node in which a transmission source node identifier cannot be detected, and logically and serially connecting the second node to the searched third node; and a transmitting unit for transmitting a musical tone signal from the serially connected second node to the first node.

15. A musical tone signal communications apparatus according to claim 14, further comprising a memory for storing path information of the serially connected transmission source second node in the first or third node.

16. A musical tone signal communications apparatus comprising:

a detector unit for detecting a transmission source node identifier stored in each node;

a connecting unit for logically and serially connecting a second node to a first node if said detector unit cannot detect a transmission source node identifier stored in the first node, but if said detector unit detects a transmission source node identifier stored in the first node, searching a third node in which a transmission source node identifier cannot be detected, and logically and serially connecting the second node to the searched third node; and a transmitting unit for adding a signal received at the serially connected third node from the transmission source second node to a signal generated by the third node and transmitting an added signal to the first node.

17. A musical tone signal communications apparatus according to claim 16, further comprising a memory for storing path information of the serially connected transmission source second node in the first or third node.

18. A musical tone signal communications method comprising the steps of:

(a) adjusting a timing and level of a digital musical tone signal;

(b) adding an adjusted digital musical tone signal to a digital musical tone signal received from an external source; and (c) transmitting an added digital musical tone signal to an external receiver.

19. A musical tone signal communications method comprising the steps of:

(a) detecting a transmission source node identifier stored in a first node;

(b) logically and serially connecting a second node to the first node if a transmission source node identifier in the first node cannot be detected, but if a transmission source node identifier in the first node is detected, searching a third node in which a transmission source node identifier cannot be detected, and logically and serially connecting the second node to the searched third node; and (c) transmitting a musical tone signal from the serially connected second node to the first node.

20. A musical tone signal communications method comprising the steps of:

(a) detecting a transmission source node identifier stored in a first node;

(b) logically and serially connecting a second node to the first node if a transmission source node identifier in the first node cannot be detected, but if a transmission source node identifier in the first node is detected, searching a third node in which a transmission source node identifier cannot be detected, and logically and serially connecting the second node to the searched third node; and (c) adding a signal received at the serially connected third node from the transmission source second node to a signal generated by the third node or to a signal received from an external device and transmitting an added signal to the first node.

21. A musical tone signal communications method of transmitting a musical tone signal by setting a communication path to a plurality of nodes each being capable of transferring a signal, the method comprising the steps of:

(a) recording a transmission source node identifier of each node;

(b) instructing to set a new communication path from a second node to a first node;

(c) checking a transmission source node identifier stored in the first node;

(d) logically and serially connecting the second node to the first node if there is no transmission source node identifier stored in the first node, but if a transmission source node identifier in the first node is detected, searching for a third node having no transmission source node identifier, and logically and serially connecting the second node to the searched third node;

(e) recording information on a transmission source node identifier of the searched third node; and (f) adding a signal received at the serially connected third node from the transmission source second node to a signal generated by the third node or to a signal received from an external device and transmitting an added signal to the first node.

\* \* \* \* \*